United States Patent
Flecke et al.

(10) Patent No.: US 9,878,478 B2
(45) Date of Patent: Jan. 30, 2018

(54) ROLLER DEVICE FOR TREATING FLAT MATERIAL, IN PARTICULAR FOR SMOOTHING FOILS OR PLATES, SMOOTHING DEVICE, AND METHOD FOR PRODUCING FLAT MATERIAL, IN PARTICULAR FOILS OR PLATES

(71) Applicant: Bayer Intellectual Property GmbH, Monheim (DE)

(72) Inventors: Jürgen Flecke, Dormagen (DE); Alexander Paulus, Dormagen (DE); Jörg Nickel, Dormagen (DE); Andreas Weistroffer, Leverkusen (DE)

(73) Assignee: COVESTRO DEUTSCHLAND AG (DE)

( * ) Notice: Subject to any disclaimer, the term of this patent is extended or adjusted under 35 U.S.C. 154(b) by 763 days.

(21) Appl. No.: 14/352,694

(22) PCT Filed: Oct. 16, 2012

(86) PCT No.: PCT/EP2012/070476
§ 371 (c)(1),
(2) Date: Sep. 29, 2014

(87) PCT Pub. No.: WO2013/057097
PCT Pub. Date: Apr. 25, 2013

(65) Prior Publication Data
US 2015/0014880 A1    Jan. 15, 2015

(30) Foreign Application Priority Data
Oct. 19, 2011 (EP) .................................. 11185770

(51) Int. Cl.
B29C 47/00    (2006.01)
B29C 47/92    (2006.01)
(Continued)

(52) U.S. Cl.
CPC .......... *B29C 47/004* (2013.01); *B29C 43/222* (2013.01); *B29C 43/46* (2013.01);
(Continued)

(58) Field of Classification Search
CPC ... B29C 47/004; B29C 47/92; B29C 47/0805; B29C 47/0021; B29C 43/222;
(Continued)

(56) References Cited

U.S. PATENT DOCUMENTS 3,129,457 A * 4/1964 Carter .................. B29C 59/046
                                                                264/284
4,247,507 A * 1/1981 Katoh ..................... B29C 59/04
                                                                264/210.2
(Continued)

FOREIGN PATENT DOCUMENTS

CA    2222781 A1    12/1996
DE    4343864 A1    6/1995
(Continued)

OTHER PUBLICATIONS

International Search Report for PCT/EP2012/070476 dated Feb. 7, 2013.
(Continued)

*Primary Examiner* — Jeffrey Wollschlager
(74) *Attorney, Agent, or Firm* — Drinker Biddle & Reath LLP

(57) ABSTRACT

The present invention relates to a roller device for treating sheet-form material, in particular for smoothing films (F*) or sheets, comprising a first roller unit 1 and a second roller unit 2, wherein each roller unit (1, 2) comprises:
  at least one drive motor with a motor moment of inertia $J_M$,
  a roller (10, 20) with a roller moment of inertia $J_W$, and
(Continued)

at least one gear for the kinematic coupling of the roller (10, 20) to the at least one drive motor with a transmission ratio $i_{MW}$ between the at least one drive motor and the roller (10, 20), wherein the roller (20) of the second roller unit (2) is rotatable in the opposite direction to the roller (10) of the first roller unit (1), and wherein there is formed between the roller (10) of the first roller unit (1) and the roller (20) of the second roller unit (2) a first roller gap (40) through which the sheet-form material (F) is guided. According to the invention, the roller device is characterized in that in at least one of the first and second roller units (1, 2), the moment of inertia/speed ratio between the at least one drive motor and the roller (10, 20) $M_{MW}$ is ≤6 and the transmission ratio $1 < i_{MW} \leq 40$ is chosen, wherein $$M_{MW} = \frac{J_M}{J_W} \cdot i_{MW}^2$$

where $$i_{MW} = \left(\frac{n_M}{n_W}\right)$$

where $n_M$: speed of the drive motor and $n_W$: speed of the roller (10, 20). The invention relates further to a smoothing device for smoothing films or sheets, and to a process for the production of sheet-form material, in particular of films or sheets.

19 Claims, 1 Drawing Sheet

(51) Int. Cl.
| | |
|---|---|
| *B29C 43/22* | (2006.01) |
| *B29C 43/46* | (2006.01) |
| *B29C 43/58* | (2006.01) |
| *B29C 47/88* | (2006.01) |
| *B29C 47/08* | (2006.01) |
| *B29L 7/00* | (2006.01) |
| *B29C 47/90* | (2006.01) |

(52) U.S. Cl.
CPC .......... *B29C 43/58* (2013.01); *B29C 47/0021* (2013.01); *B29C 47/0805* (2013.01); *B29C 47/8855* (2013.01); *B29C 47/92* (2013.01); *B29C 47/8845* (2013.01); *B29C 47/906* (2013.01); *B29C 2947/9258* (2013.01); *B29C 2947/92542* (2013.01); *B29L 2007/002* (2013.01)

(58) Field of Classification Search
CPC .............. B29C 47/8855; B29C 47/906; B29C 47/8845; B29C 2947/92542; B29C 2947/9258; B29L 2007/002
See application file for complete search history.

(56) References Cited

U.S. PATENT DOCUMENTS

| | | | | |
|---|---|---|---|---|
| 5,595,335 | A * | 1/1997 | Borel | B65H 20/005 226/113 |
| 6,250,904 | B1 * | 6/2001 | Reddy | B29C 43/245 425/135 |
| 6,495,214 | B1 * | 12/2002 | Prix | B29C 43/222 427/211 |
| 6,781,271 | B2 * | 8/2004 | Meyer | D21G 1/0006 310/118 |
| 2003/0035972 | A1 * | 2/2003 | Hanson | B32B 7/02 428/480 |
| 2003/0159600 | A1 * | 8/2003 | Ruthven | A61F 13/15731 101/3.1 |
| 2004/0000826 | A1 | 1/2004 | Meyer et al. | |
| 2006/0236877 | A1 * | 10/2006 | Strand | B29C 35/0894 101/6 |
| 2006/0266468 | A1 * | 11/2006 | Germano | H05K 13/06 156/257 |
| 2010/0239837 | A1 * | 9/2010 | Hagiwara | B29C 47/0021 428/220 |
| 2013/0059080 | A1 * | 3/2013 | Bay | B29C 43/28 427/256 |

FOREIGN PATENT DOCUMENTS

| | | |
|---|---|---|
| EP | 0828599 A1 | 12/1996 |
| EP | 1340608 A1 | 9/2003 |
| WO | WO-2006098939 A1 | 9/2006 |

OTHER PUBLICATIONS

Translation of the International Preliminary Report on Patentability for PCT/EP2012/070476 dated Apr. 22, 2014.

* cited by examiner

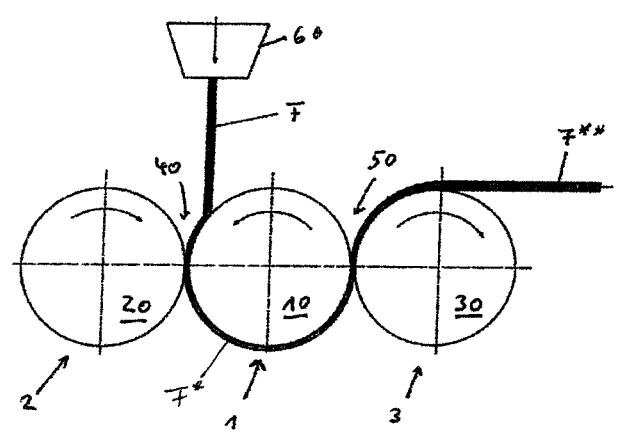

ROLLER DEVICE FOR TREATING FLAT MATERIAL, IN PARTICULAR FOR SMOOTHING FOILS OR PLATES, SMOOTHING DEVICE, AND METHOD FOR PRODUCING FLAT MATERIAL, IN PARTICULAR FOILS OR PLATES

CROSS-REFERENCE TO RELATED APPLICATIONS

This application is a national stage application (under 35 U.S.C. § 371) of PCT/EP2012/070476, filed Oct. 16, 2012, which claims benefit of European Application No. 11185770.2, filed Oct. 19, 2011, both of which are incorporated herein by reference in their entirely.

The present invention relates to a roller device for treating sheet-form material, in particular for smoothing films or sheets, comprising a first roller unit and a second roller unit, wherein each roller unit comprises at least one drive motor with a motor moment of inertia $J_M$, a roller with a roller moment of inertia $J_W$, and at least one gear for the kinematic coupling of the roller to the at least one drive motor with a transmission ratio $i_{MW}$ between the at least one drive motor and the roller, wherein the roller of the second roller unit is rotatable in the opposite direction to the roller of the first roller unit and wherein there is formed between the roller of the first roller unit and the roller of the second roller unit a first roller gap through which the sheet-form material is guided. The present invention relates further to a process for the production of sheet-form material, in particular of films or sheets.

The production of high-quality plastics films, for example of polycarbonate, by extrusion and subsequent smoothing of the extruded melt film in a smoothing apparatus using tempered smoothing rollers has been the industrial standard for many years. In the case in particular of high-quality films with a glossy surface, periodic faults in the film surface—so-called chatter marks—, which occur in particular in thicker films having a thickness of, for example, from 300 to 3000 μm, become apparent in a negative manner and impair the visual quality impression of the films. Such faults are more or less pronounced depending on the configuration of the system and the mode of operation. These faults are caused by irregularities in the detachment and calendering behaviour during the process in the smoothing apparatus, which is attributable to inadequate synchronism of the roller units used in the smoothing apparatus.

WO 2006/098939 A1 describes a roller-to-roller microreplication apparatus, in which a sheet-form material is coated on both sides with a liquid material, which cures on the sheet-form material. The microreplication apparatus comprises a first profiled roller having a first diameter, a second profiled roller having a second diameter, and a drive arrangement which is so configured for rotating the first profiled roller and the second profiled roller that the first and second rollers maintain a continuous registration within 100 micrometers, the second diameter being from 0.01 to 1 percent larger than the first diameter.

U.S. Pat. No. 6,250,904 B1 describes an extrusion apparatus for producing film sheets, in which defects which occur on the surface of the film sheets that are produced, such as ripples or chatter marks, are to be reduced. This is to be achieved by a control system for the peripheral speed of the dragging roller, with which fluctuations in speed can be reduced.

EP 0 828 599 A1 relates to a process for the production of an amorphous dyed sheet, for example of polymethyl methacrylate, polycarbonate or polyvinyl chloride. According to the process, a crystallisable thermoplastic is first melted in an extruder together with the die, and the melt is then shaped through a die and further calibrated in the smoothing apparatus with at least two rollers, smoothed and cooled, before the sheet is brought to size, the first roller of the smoothing apparatus having a temperature in the range of from 50° C. to 80° C. In order to avoid defects and fluctuations in thickness on the surface of the sheets, it is emphasised that the take-off speed must be matched precisely to the speed of the calendering rollers used.

DE 4343 864 A1 describes a method for avoiding chatter marks in the smoothing of sheet-form extrudates of thermoplastic plastic. In detail, the method provides the use of a smoothing apparatus having at least one pair of smoothing apparatus rollers, wherein the smoothing apparatus is equipped with a smoothing apparatus drive having a gear mechanism and with an electromagnetic drive control system, and the output side of the gear mechanism works on at least one of the smoothing rollers of the pair of smoothing rollers. According to the method, the tooth frequency of the gear mechanism, which is superimposed on the rotation of the output side, is measured, a switching frequency which is as close as possible to the tooth frequency is generated by means of a frequency generator, and finally the switching frequency is switched to the drive control system.

In EP 1 340 608 A1 it is proposed, in a smoothing device, to provide the drive motor of a smoothing roller with a rotor and stator arranged coaxially with one another and to connect them to the drive shaft of the smoothing roller without an intervening gear, that is to say with a transmission ratio $i_{MW}=1$. In practice, however, it has been found that such a system configuration is not sufficient for reliably avoiding chatter marks on high-quality film surfaces. Furthermore, motors that operate in such a speed and torque range are not available.

Accordingly, it was an object of the invention to provide a roller device for treating sheet-form material, in particular for smoothing films or sheets, of the type mentioned at the beginning, which avoids the disadvantages mentioned above and ensures optimal surface properties, in particular optimal smoothness and gloss of plastics films, in the treatment of sheet-form material.

The object is achieved according to the invention with a roller device according to the precharacterising clause of claim 1, in that, in at least one of the first and second roller units, the moment of inertia/speed ratio between the drive motor and the roller $M_{MW}$ is ≤6 and the transmission ratio $1<i_{MW}40$ is chosen,
wherein $$M_{MW} = \frac{J_M}{J_W} \cdot i_{MW}^2$$

where $$i_{MW} = \left(\frac{n_M}{n_W}\right)$$

where $n_M$: speed of the drive motor and $n_W$: speed of the roller.

As investigations by the applicant have shown, the combination of the ranges chosen according to the invention for the moment of inertia/speed ratio between the drive motor and the roller and the transmission ratio of the gear permits a particularly high degree of roller synchronism of each roller unit, which is a requirement for optimal surface quality also in the case of demanding film surfaces in particular in terms of reducing or avoiding chatter marks.

In Technical guide No. 7 "Dimensioning of a drive system", ABB Automation Products GmbH, Mannheim, which is available on the internet (www.abb-drives.de), a moment of inertia/speed ratio between the drive motor and the driven component of 1 is proposed. However, the relationship with the transmission ratio of the gear used has not been recognised here.

In the present invention, there is chosen for the transmission ratio $i_{MW}$ preferably a range of $5 \leq i_{MW} \leq 40$, especially $10 \leq i_{MW} \leq 40$ and particularly preferably $20 \leq i_{MW} \leq 40$.

Within the context of the present invention, "sheet-form" refers to a material whose extent in the thickness direction is markedly smaller, in particular by orders of magnitude, than its extent in the length and width directions.

It is particularly preferred in terms of a further improved surface quality if in the first and second roller units, the speed ratio between the at least one drive motor and the roller $M_{MW}$ is $\leq 6$ and the transmission ratio $1 < i_{MW} 40$ is chosen.

According to a further advantageous embodiment of the invention, the at least one drive motor of at least one of the first and second roller units is speed-controlled. Speed control of the drive motor is possible technically without a large outlay and contributes to a further improvement in the synchronism behaviour of the roller unit.

The at least one drive motor of at least one of the first and second roller units is preferably an electric motor. It can be in the form of a direct-current motor or also of an alternating-current motor. According to an advantageous embodiment of the invention, the drive motor is preferably in the form of a three-phase electric motor with frequency conversion. Precise adjustment and control of the motor speed is thereby possible. The drive motor is preferably in the form of a synchronous motor which, owing to the system, ensures a particularly high degree of synchronism. In order further to increase the synchronism of such a synchronous motor, it can further be provided that the motor is in multipolar, in particular 10-polar, form.

At lower speeds in particular, so-called cogging torques impair the synchronism behaviour of electric motors. In order to compensate for such cogging torques, it is provided according to a further embodiment of the invention that the at least one drive motor of at least one of the first and second roller units comprises a compensation unit for compensating for the cogging torques. Such a compensation unit can be of different forms. Preferably, it is in the form of a software module in the control system of the drive motor.

Further improvements are obtained when the at least one drive motor of at least one of the first and second roller units is coupled by way of a rigid coupling to the at least one gear, and/or the roller of at least one of the first and second roller units is coupled by way of a rigid, that is to say slip-free, coupling to the at least one gear. The rigid coupling of the drive and the load is found to be necessary for the control of roller torques or peripheral speeds.

According to a further advantageous embodiment of the invention, the gear of at least one of the first and second roller units is in the form of a planetary gear, in particular in the form of a planetary gear that is not free from play. As investigations by the applicant have surprisingly shown, particularly good synchronism properties cannot be achieved in the case of a rigid coupling between the drive motor, the gear and the roller by a freedom from play in the gear. A gear that is free from play is associated with the disadvantage of generating innate instability in the system by the rolling of the interlocked gear wheels.

According to a further advantageous embodiment of the invention, the roller device comprises a control unit for controlling the at least one drive motor of the first roller unit and the at least one drive motor of the second roller unit, wherein the control unit is so configured that the torque and/or the peripheral speed of the roller of the first roller unit and of the roller of the second roller unit are each so controlled that one roller is coupled to the other roller by means of the sheet-form material guided through the roller gap. By means of this type of control, in which the peripheral speed always represents the control variable, it is thus possible to establish in a defined manner dragging and dragged states, based on one of the rollers, as coupling beneath the rollers, which in investigations by the applicant has been found to be particularly effective in terms of the desired avoidance of chatter marks, in particular in the smoothing of plastics films or sheets. It is supposed that the dragging or dragged states cause shear forces to act in the material of the films or sheets, so that the surface acquires a particularly uniform visual appearance and, in particular, no more chatter marks are visible. The dragging or dragged states between the rollers can be established by defined ratios of the roller torques or the peripheral speeds that differ from 1 slightly—for example in the thousandth part range—and can be obtained by way of the peripheral speed as the control variable.

According to an embodiment that develops the invention further, the roller device comprises a third roller unit, wherein there is formed between the roller of the first roller unit and the roller of the third roller unit a second roller gap through which the sheet-form material is further guided after leaving the first roller gap. The axes of the roller of the first roller unit, of the roller of the second roller unit and of the roller of the third roller unit can especially be arranged substantially in a plane which has any desired orientation but is preferably horizontal, wherein the sheet-form material, after leaving the first roller gap, is guided to the second roller gap on the peripheral surface of the roller of the first roller unit. It is likewise possible to pivot in particular the axes of the third roller unit out of the plane in order to vary the manner in which the material winds round the roller of the first roller unit. In the case of the smoothing of plastics films, such smoothing can be achieved particularly effectively by two roller gaps which follow one another directly.

A further aspect of the present invention relates to a smoothing device for smoothing films or sheets having a roller device according to any one of claims 1 to 13. With regard to the advantages of such a smoothing device, reference is made to the above.

A further aspect of the present invention relates to a process for the production of sheet-form material, in particular of films or sheets, having the following steps:

production of a melt film of the sheet-form material, in particular by extrusion, smoothing of the melt film in a first roller gap between a roller of a first roller unit with a roller moment of inertia $J_{W1}$ and a roller of a second roller unit with a roller moment of inertia $J_{W2}$, wherein the roller of the first roller unit and the roller of the second roller unit are each coupled by way of at least one gear to at least one drive motor with a motor moment of inertia $J_{M1,M2}$, wherein the process is characterised in that, in the case of the roller of at least one roller unit, the moment of inertia/speed ratio between the drive motor and the roller $M_{MW}$ is $\leq 6$ and the transmission ratio is $1 < i_{MW} \leq 40$, wherein $$M_{MW} = \frac{J_M}{J_W} \cdot i_{MW}^2$$

where $$i_{MW} = \left(\frac{n_M}{n_W}\right)$$

where $n_M$: speed of the drive motor and $n_W$: speed of the roller.

With regard to the advantages of the process according to the invention, reference is again made to the above.

BRIEF DESCRIPTION OF THE DRAWING

The invention is explained in greater detail below by means of a drawing showing an exemplary embodiment. In the drawing:

FIG. 1 shows a smoothing device for smoothing films or sheets, in particular melt films extruded immediately beforehand.

The smoothing device of FIG. 1, which is shown in a highly diagrammatic sectional drawing, comprises a total of three roller units 1, 2, 3, each of which comprises a drive motor with a motor moment of inertia $J_{M1,M2,M3}$, a tempered roller 10, 20, 30 with a roller moment of inertia $J_{W1,W2,W3}$ and a gear for the kinematic coupling of the roller 10, 20, 30 to the associated drive motor with a transmission ratio $i_{MW1,MW2,MW3}$ between the drive motor and the roller 10, 20, 30. The roller 20 of the second roller unit 2 is rotatable in the opposite direction to the roller 10 of the first roller unit 1. Likewise, the roller 30 of the third roller unit 3 is rotatable in the opposite direction to the roller 10 of the first roller unit. Between the roller 10 of the first roller unit 1 and the roller 20 of the second roller unit 2 there is formed a first roller gap 40. Furthermore, between the roller 10 of the first roller unit 1 and the roller 30 of the third roller unit 3 there is formed a second roller gap 50, the melt film to be smoothed passing first through the first roller gap and then through the second roller gap, as is explained in detail below.

In the present case, in the case of the three roller units, the moment of inertia/speed ratio between the at least one drive motor and the roller $M_{MWi}$ is chosen to be $\leq 6$ and the transmission ratio is chosen to be $1 < i_{MWi} \leq 40$, wherein $$M_{MW} = \frac{J_M}{J_W} \cdot i_{MW}^2$$

where $$i_{MW} = \left(\frac{n_M}{n_W}\right)$$

where $n_M$: speed of the drive motor and $n_W$: speed of the roller and roller index i=1, 2, 3.

For the transmission ratio $i_{MW}$, a range of preferably $5 \leq i_{MW} \leq 40$, especially $10 \leq i_{MW} \leq 40$ and particularly preferably $20 \leq i_{MW} \leq 40$ is chosen.

By the choice of these parameters, a particularly high degree of synchronism of the rollers is achieved, as a result of which the surface quality of the smoothed film is improved significantly. In particular, the visibility of chatter marks can be reduced very considerably or even eliminated altogether.

The indicated drawing of the smoothing device shows the three rollers 10, 20, 30 of the three roller units 1, 2, 3 in a sectional view. Accordingly, the gear, which in the present case is coupled in a known manner directly to a shaft journal, and the drive motor, which in turn is coupled to the gear input shaft, are not shown. It is possible to couple a gear and a drive motor to the two shaft journals of each roller. In the present case, each drive motor is coupled to its associated gear by way of a rigid coupling. Likewise, each gear is coupled to the shaft of its associated roller 10, 20, 30 by way of a rigid coupling. The gears are in each case in the form of planetary gears which are not free from play.

In the present case, the electric motors driving the rollers 10, 20, 30 are in the form of three-phase electric motors with frequency conversion, especially in the form of synchronous motors. Precise adjustment and control of the motor speed with optimal synchronism properties is thereby possible. In order further to increase the synchronism of such a synchronous motor, it is further provided that the motors are in multipolar, in particular 10-polar, form. A common control unit (not shown) allows the drive motors to be controlled and adjusted jointly. Furthermore, each of the drive motors of the roller units 1, 2, 3 comprises a compensation unit for compensating for the cogging torques, which compensation units in the present case are each in the form of a software module in the control unit of the drive motors.

The mode of operation of the smoothing device is as follows:

In an extrusion unit (not shown), a melt of polycarbonate, for example, is produced in a distributor tool 60 (die) with a thickness of typically from 500 to 1200 μm and is passed in the form of a melt film F in the direction towards the rollers 10, 20, 30, which are arranged beneath the distributor tool in a horizontal plane, where it is smoothed. The melt film F there enters the roller gap 40 formed between the roller 10 of the first roller unit 1 and the roller 20 of the second roller unit 2. As is shown, the rollers 1, 2 rotate in opposite directions and thereby draw the melt film F into the roller gap 40. After leaving the roller gap 40, the film sheet F* is guided on the underside of the arrangement of the rollers 1, 2, 3 around the roller 1 through an angle of about 180° and enters from below the second roller gap 50, which is formed between the roller 1 and the roller 3 rotating in the opposite direction to the roller 1, where it is smoothed further. After leaving the second roller gap 50, the smoothed film sheet F* is guided around the roller 3 through an angle of about 90°, for example, and is then taken off in the form of a finished, smoothed film sheet F**.

In order to optimise the smoothing of the film sheet and eliminate the formation of chatter marks as completely as possible, the control unit the drive motors of the rollers 1, 2, 3 is so configured in the present case that the torque and/or the peripheral speed of the rollers 1, 2, 3 are each controlled in such a manner that one roller drags the other roller by means of the sheet-form material guided through the roller gap. In the present case, the roller 1 serves as the guide roller in respect of the torque and the peripheral speed.

EXAMPLE

In a smoothing device of the type operated above for smoothing polycarbonate films, three roller units were operated with the following parameters:

| | |
|---|---|
| Motor power: | 4.49 kW |
| Motor torque: | 23.6 Nm |
| Motor speed: | 2000 min⁻¹ |
| Motor moment of inertia $J_M$: | 65 kgcm² |
| Transmission ratio $i_{MW}$: | 35.34 |
| Roller torque: | 834.02 Nm |
| Roller speed: | 56.59 min⁻¹ |
| Moment of inertia/speed ratio $M_{MW}$: | 4.91 |

With these settings, no more chatter marks were visible on the finished, smoothed polycarbonate film.

COMPARISON EXAMPLE

In a smoothing device of the type operated above for smoothing polycarbonate films, three roller units were operated with the following parameters:

| | |
|---|---|
| Motor power: | 1.48 kW |
| Motor torque: | 2.35 Nm |
| Motor speed: | 6000 min⁻¹ |
| Motor moment of inertia $J_M$: | 1.5 kgcm² |
| Transmission ratio $i_{MW}$: | 125.6 |
| Roller torque: | 443.37 Nm |
| Roller speed: | 47.77 min⁻¹ |
| Moment of inertia/speed ratio $M_{MW}$: | 16.83 |

Here, clear chatter marks were visible on the surface of the finished, smoothed polycarbonate surface.

The invention claimed is:

1. A roller device for treating a sheet-form material (F), comprising a first roller unit and a second roller unit, wherein each roller unit comprises:
at least one drive motor with a motor moment of inertia $J_M$,
a roller with a roller moment of inertia $J_W$, and
at least one gear for the kinematic coupling of the roller to the at least one drive motor with a transmission ratio $i_{MW}$ between the at least one drive motor and the roller,
wherein the roller of the second roller unit is rotatable in the opposite direction to the roller of the first roller unit, and wherein there is formed between the roller of the first roller unit and the roller of the second roller unit a first roller gap through which the sheet-form material (F) is guided,
characterised in that
in at least one of the first and second roller units, the moment of inertia/speed ratio between the at least one drive motor and the roller $M_{MW}$ is ≤6 and the transmission ratio $5<i_{MW}≤40$ is chosen,
wherein $$M_{MW} = \frac{J_M}{J_W} \cdot i_{MW}^2$$

where $$i_{MW} = \left(\frac{n_M}{n_W}\right)$$

where $n_M$: speed of the drive motor and $n_W$: speed of the roller.

2. The roller device according to claim 1, characterised in that
in the first and second roller units the speed ratio between the at least one drive motor and the roller $M_{MW}$ is ≤6 and the transmission ratio $5<i_{MW}≤40$ is chosen.

3. The roller device according to claim 1, characterised in that
the at least one drive motor of at least one of the first and second roller units is speed-controlled.

4. The roller device according to claim 1, characterised in that
the at least one drive motor of at least one of the first and second roller units is a three-phase electric motor with frequency conversion.

5. The roller device according to claim 4, characterised in that
the at least one drive motor of at least one of the first and second roller units is a synchronous motor.

6. The roller device according to claim 5, characterised in that
the synchronous motor is in multipolar form.

7. The roller device according to claim 4, characterised in that
the at least one drive motor of at least one of the first and second roller units comprises a compensation unit for compensating for the cogging torques.

8. The roller device according to claim 1, characterised in that
the at least one drive motor of at least one of the first and second roller units and/or the roller of at least one of the first and second roller units is coupled by way of a rigid coupling to the at least one gear.

9. The roller device according to claim 1, characterised in that
the at least one gear of at least one of the first and second roller units is in the form of a planetary gear.

10. The roller device according to claim 1, characterised in that
the roller device comprises a control unit for controlling the at least one drive motor of the first roller unit and the at least one drive motor of the second roller unit, wherein the control unit is so configured that the torque and/or the peripheral speed of the roller of the first roller unit and of the roller of the second roller unit are each so controlled that one roller is coupled to the other roller by means of the sheet-form material (F) guided through the roller gap.

11. The roller device according to claim 1, characterised in that
the roller device comprises a third roller unit comprising a roller, wherein there is formed between the roller of the first roller unit and the roller of the third roller unit a second roller gap through which the sheet-form material (F) is further guided after leaving the first roller gap.

12. The roller device according to claim 11, characterised in that
the axes of the roller of the first roller unit, of the roller of the second roller unit and of the roller of the third roller unit are arranged substantially in a plane, wherein the sheet-form material (F), after leaving the first roller gap, is guided to the second roller gap on the peripheral surface of the roller of the first roller unit.

13. A smoothing device for smoothing films or sheets having a roller device according to claim 1.

14. A process for the production of sheet-form material, comprising:
producing a melt film of the sheet-form material (F),
smoothing of the melt film in a first roller gap between a roller of a first roller unit with a roller moment of inertia $J_{W1}$ and a roller of a second roller unit with a roller moment of inertia $J_{W2}$, wherein the roller of the first roller unit and the roller of the second roller unit are each coupled by way of at least one gear to at least one drive motor with a motor moment of inertia $J_{M1,M2}$, characterised in that in the case of the roller of at least one roller unit, the moment of inertia/speed ratio between the drive motor and the roller $M_{MW}$ is ≤6 and the transmission ratio is $5 < i_{MW} \leq 40$, wherein $$M_{MW} = \frac{J_M}{J_W} \cdot i_{MW}^2$$

where $$i_{MW} = \left(\frac{n_M}{n_W}\right)$$

where $n_M$: speed of the drive motor and $n_W$: speed of the roller.

15. The roller device according to claim 1, wherein there is chosen as the transmission ratio $10 \leq i_{MW} \leq 40$.

16. The roller device according to claim 1, wherein there is chosen as the transmission ratio $20 \leq i_{MW} \leq 40$.

17. The roller device according to claim 6, wherein the synchronous motor is in 10-polar form.

18. The roller device according to claim 9, wherein the at least one gear of at least one of the first and second roller units is in the form of a planetary gear that is not free from play.

19. The process according to claim 14, wherein the melt film of the sheet-form material is produced by extrusion.

\* \* \* \* \*